(12) United States Patent
Kassai

(10) Patent No.: US 6,679,552 B1
(45) Date of Patent: Jan. 20, 2004

(54) NURSERY INSTRUMENT

(75) Inventor: Kenzou Kassai, Osaka (JP)

(73) Assignee: Aprica Kassai Kabushikikaisha, Osaka (JP)

(*) Notice: Subject to any disclaimer, the term of this patent is extended or adjusted under 35 U.S.C. 154(b) by 0 days.

(21) Appl. No.: 10/110,349

(22) PCT Filed: Oct. 25, 2000

(86) PCT No.: PCT/JP00/07488

§ 371 (c)(1),
(2), (4) Date: Apr. 10, 2002

(87) PCT Pub. No.: WO01/30604

PCT Pub. Date: May 3, 2001

(30) Foreign Application Priority Data

Oct. 27, 1999 (JP) .......................... 11/305984

(51) Int. Cl.[7] ................................. A47C 1/08
(52) U.S. Cl. ................... 297/250.1; 297/256.12
(58) Field of Search ........... 297/354.13, 256.13, 297/250.1, 256.12

(56) References Cited

U.S. PATENT DOCUMENTS

| | | | | |
|---|---|---|---|---|
| 4,836,573 A | * | 6/1989 | Gebhard | 280/644 |
| 5,092,004 A | * | 3/1992 | Cone et al. | 5/94 |
| 5,115,523 A | * | 5/1992 | Cone | 5/94 |
| 5,790,997 A | * | 8/1998 | Ruehl | 5/618 |
| 5,803,535 A | * | 9/1998 | Jane Cabagnero | 297/183.3 |
| 6,196,629 B1 | * | 3/2001 | Onishi et al. | 297/256.12 |

FOREIGN PATENT DOCUMENTS

| | | |
|---|---|---|
| EP | 0631903 | 1/1995 |
| EP | 0853018 | 7/1998 |
| JP | 49-113959 | 9/1974 |
| JP | 61-18951 | 2/1986 |
| JP | 2000301969 | 10/2000 |

* cited by examiner

Primary Examiner—Peter M. Cuomo
Assistant Examiner—Erika Garrett
(74) Attorney, Agent, or Firm—W. F. Fasse; W. G. Fasse

(57) ABSTRACT

In this nursery instrument, a selection plate (100) is fixed to a reinforcing plate (29) with a pin (110), to be slidable through a slot (125e). A through hole (125a, 125b, 125c) has the same bore diameter as an engaging hole (25a, 25b, 25c), and a through hole (125d) consists of a slot having a length substantially twice that of an engaging hole (25d) in a sliding direction. According to this mechanism, only a bed state can be selected up to a lapse of a constant time after birth of a baby. Thus, a nursery instrument capable of protecting respiration of the baby can be provided on the basis of medical criteria for the baby.

3 Claims, 20 Drawing Sheets

| STUDIED OBJECT |||| 
|---|---|---|---|
| NAME OF PATIENT | BIRTH WEIGHT(g) | NUMBER OF GESTATIONAL WEEKS(w) | AGE IN DAY (days) |
| 1.HA | 3,100 | 38 | 7 |
| 2.RY | 3,160 | 39 | 4 |
| 3.SA | 3,518 | 40 | 5 |
| 4.FU | 2,748 | 37 | 8 |
| 5.IM | 2,962 | 38 | 4 |
| 6.SG | 2,898 | 40 | 11 |
| 7.KA | 2,664 | 38 | 8 |
| 8.MO | 2,546 | 38 | 8 |
| 9.IW | 3,174 | 39 | 7 |
| 10.MR | 2,484 | 37 | 4 |
| 11.TG | 2,730 | 39 | 4 |
| 12.NG | 2,662 | 37 | 11 |

BED SEAT AND CHAIR SEAT

Bed seat     Chair seat

| COMPARISON OF DESATURATION (SpO2<95%) |||| 
|---|---|---|---|
| - BED SEAT AND CHAIR SEAT - |||| 
| COUNT OF OBSERVATION OF DESATURATION (SpO2<95%) SUSTAINING AT LEAST 10 SECONDS/30 MINUTES ||||
| NAME OF PATENT | cot | Bed-type | Chair-type |
| 1.HA | 0 | 0 | 20 (4) |
| 2.RY | 0 | 1 | 18 (1) |
| 3.SA | 0 | 0 | 17 |
| 4.FU | 0 | 1 | 9 |
| 5.IM | 0 | 0 | 3 |
| 6.SG | 0 | 0 | 1 |
| 7.KA | 0 | 0 | 0 |
| 8.MO | 0 | 0 | 0 |
| 9.IW | 0 | 0 | 0 |
| 10.MR | 0 | 0 | 0 |
| 11.TG | 0 | 0 | 0 |
| 12.NG | 0 | 0 | 0 |

( ): SpO2<90%

NURSERY INSTRUMENT

TECHNICAL FIELD

The present invention relates to a nursery instrument based on medical criteria for a baby in neonatal infancy, infancy and childhood, and more specifically, it relates to the structure of a nursery instrument enabling protection of the respiration of a baby.

BACKGROUND ART

It is most important for a nursery instrument that the same is excellent in safe performance and comfortableness for a baby. Particularly for a baby in neonatal infancy or infancy having a still undeveloped brain, it is remarkably important to protect not only the brain and the neck but also respiration.

A structure required to a nursery instrument based on medical criteria for a baby is now described. A baby, readily regarded as a miniature adult, is so immature in various functions for staying alive that mistreatment of the baby may result in an aftereffect. If an external impact is applied to the baby by a traffic accident or the like, for example, the head of the baby is more readily shocked than the remaining body regions due to the relatively heavy weight of the head and the weak muscles of the neck supporting the head.

Further, the cranial bones and the cerebral blood vessels protecting the brain of the baby are still insufficient in structure and function. An uprightly held baby under the age of one, particularly up to six months after birth, may be vertically dandled, while it may have an attack of cerebral hemorrhage resulting in an aftereffect or even in death if strongly shaken back and forth.

Also in daily life receiving no external impact, it is important not to inhibit the baby, making abdominal respiration by swelling its abdomen, from swelling the abdomen (not to seat the baby in an L-shaped posture, for example). Even a healthy baby readily congests its nose, and there is a possibility of resulting in an oxygen depletion state (a state where percutaneous oxygen saturation ($SpO_2$) is reduced) when the baby is laid prone or in a posture pressing its abdomen. In this case, abrupt cardiac standstill may conceivably result.

In consideration of the above, it is important to lay a baby under the age of six months on its back, not to press the abdomen. The aforementioned physiological characteristics still remain in an active baby exceeding the age of sixth months, and it can be said preferable to lay the baby on its back when it sleeps.

In a nursery instrument such as a child seat or a baby rack, therefore, it is an extremely important function for protecting a baby to render a bed face state selective and have a structure capable of selecting only the bed face state until a constant period elapses after birth of the baby in order to protect the baby in true meaning and to protect not only the brain and the neck but also respiration of the baby in due consideration of such biological characteristics of the baby.

SUMMARY OF THE INVENTION

Accordingly, it is an object of the present invention to provide a nursery instrument having a structure capable of protecting a baby in several respects and particularly a baby's respiration.

In order to attain the aforementioned object, the nursery instrument according to the present invention is capable of selecting a bed face state substantially flattening a seat portion and a backrest portion and a seat face state uprighting the backrest portion, and comprises selection means enabling employment in the bed face state and disabling employment in the seat face state.

Such selection means enables selection of only the bed face state until a constant period elapses after birth of a baby, whereby the nursery instrument regularly provides the bed face state to the baby in this period, not to press the abdomen of the baby.

Consequently, it is possible to avoid an oxygen depletion state (a state where percutaneous oxygen saturation ($SpO_2$) is reduced) and abrupt cardiac standstill resulting from the oxygen depletion state (the state where percutaneous oxygen saturation ($SpO_2$) is reduced) without preventing abdominal respiration of the baby, for protecting the baby in true meaning.

In order to carry out the aforementioned invention in a more preferable state, the following modes are employed:

The aforementioned nursery instrument comprises locating means provided on the aforementioned backrest portion for locating the aforementioned backrest portion on the said seat portion, a first engaging portion provided on the aforementioned seat portion for engaging with the aforementioned locating means to form the bed face sate substantially flattening the aforementioned seat portion and the aforementioned backrest portion, a second engaging portion provided on the aforementioned seat portion for engaging with the aforementioned locating means to form the seat face state uprighting the aforementioned backrest portion, and an intermediate engaging portion provided on the aforementioned seat portion for engaging with the aforementioned locating means to attain inclination in an intermediate stage between the bed face state and the seat face state. Further, the aforementioned selection means enables only engagement of the locating means with the aforementioned first engaging portion, and disables engagement with the aforementioned second engaging portion and the aforementioned intermediate engaging portion.

On the other hand, the aforementioned selection means preferably enables only engagement of the aforementioned locating means with the aforementioned first engaging portion and the aforementioned second engaging portion, and disables engagement with the aforementioned intermediate engaging portion.

Preferably, the aforementioned locating means has an engaging member engaging with the aforementioned first engaging portion, the aforementioned second engaging portion and the aforementioned intermediate engaging portion, the aforementioned first engaging portion, the aforementioned second engaging portion and the aforementioned intermediate engaging portion have a plurality of holes provided stepwise, and the aforementioned selection means has a plate member sliding along the aforementioned holes for opening the aforementioned first engaging portion, the aforementioned second engaging portion and the aforementioned intermediate engaging portion on a first position while opening the aforementioned first engaging portion and closing the aforementioned second engaging portion and the aforementioned intermediate engaging portion on a second position.

On the other hand, the aforementioned selection means preferably has a plate member sliding along the aforementioned holes for opening the aforementioned first engaging portion, the aforementioned second engaging portion and the aforementioned intermediate engaging portion on a first position while opening the aforementioned first engaging portion and the aforementioned second engaging portion and closing the aforementioned intermediate engaging portion on a second position.

Further, preferably, the aforementioned second engaging portion and the aforementioned intermediate engaging portion are provided in positions separated or spaced from the aforementioned locating means more than the aforementioned first engaging portion, and the aforementioned locating means has an engaging member adjusted in projection length to engage with only the aforementioned first engaging portion while not engaging with the aforementioned second engaging portion and the aforementioned intermediate engaging portion.

Further, preferably, the aforementioned intermediate engaging portion is provided in a position separated or spaced from the aforementioned locating means more than the aforementioned first engaging portion and the aforementioned second engaging portion, and the aforementioned locating means has an engaging member adjusted in projection length to engage with the aforementioned first engaging portion and the aforementioned second engaging portion while not engaging with the aforementioned intermediate engaging portion.

Preferably, the aforementioned selection means has lock means for fixing mutual positional relation between the aforementioned seat portion and the aforementioned backrest portion in order to maintain the bed face state substantially flattening the aforementioned seat portion and the aforementioned backrest portion.

DETAILED DESCRIPTION OF PREFERRED EXAMPLE EMBODIMENTS AND OF THE BEST MODE OF THE INVENTION

A nursery instrument having a structure according to the present invention for truly protecting the respiration of a baby will now be described in detail.

Figure 1:
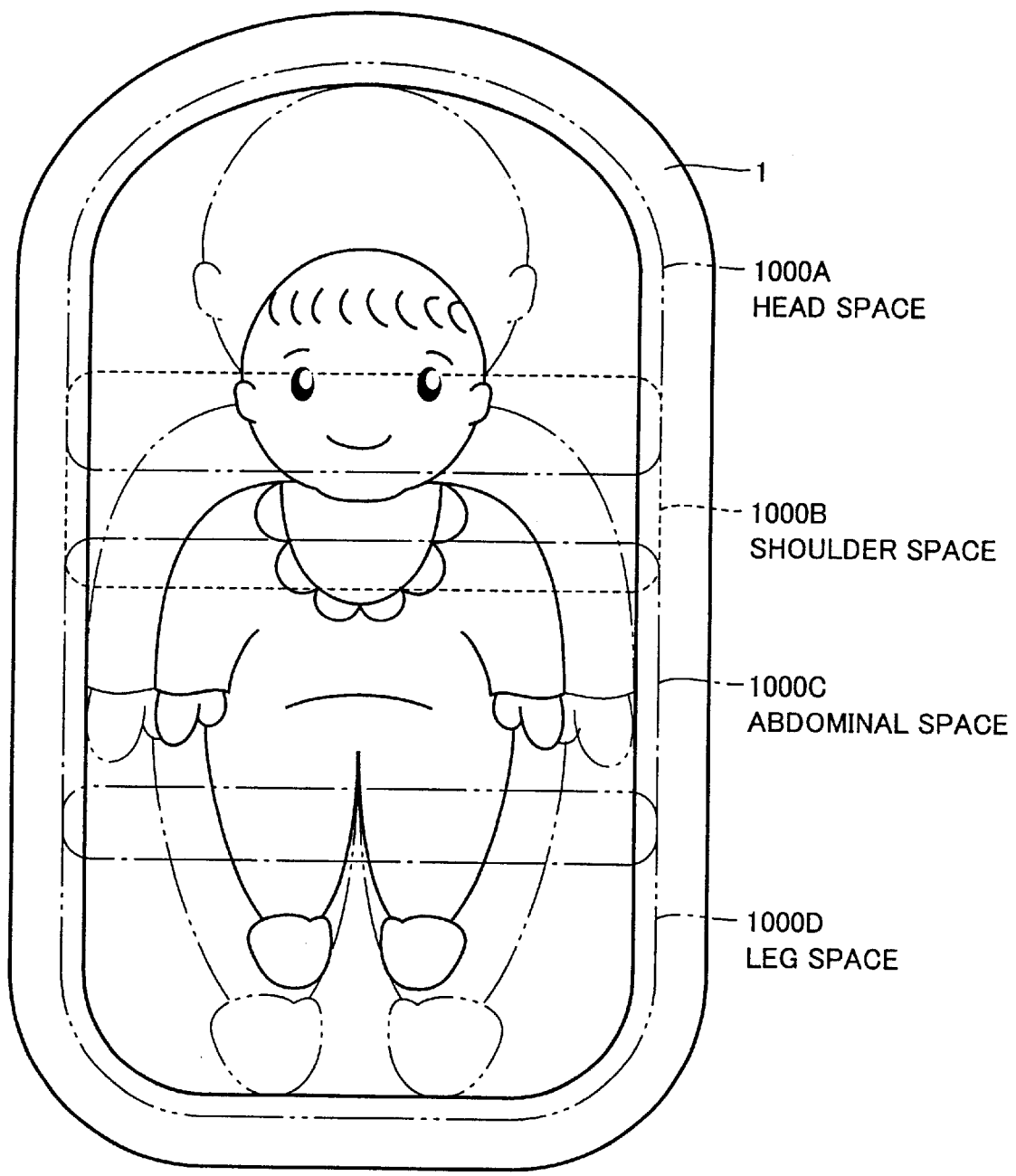
FIG. 1 is a model diagram showing the concept of spaces for a baby in a nursery instrument.

As shown in FIG. 1, a baby grows through neonatal infancy, infancy and childhood, and its habitus changes. For example, change of the shape of the head, change of the shoulder length, change of the size of the body, change of the size of the loin, change of the length of the legs and the like can be listed.

On the other hand, the internal space of a nursery instrument 1 can be classified into a head space 1000A, a shoulder space 1000B, an abdominal space 1000C and a leg space 1000D in correspondence to the body regions of the baby. Therefore, the capacity of a support space can be totally changed by implementing a structure rendering the capacity in each space variable. A general nursery instrument employs a structure allowing selection of a bed face state and a seat face state. In the nursery instrument, therefore, the support space for receiving the baby must satisfy the aforementioned medical criteria for the baby. Thus, it is possible to regularly provide an optimum space responsive to the habitus of the baby for improving safe performance.

As an exemplary nursery instrument employing a mechanism allowing selection of a bed face state and a seat state, the structure of a child seat 2000 is schematically described with reference to FIGS. 2 and 3. The child seat 2000 has a structure allowing selection of a bed face state shown in FIG. 2 and a seat face state shown in FIG. 3 in response to growth of the body of the baby.

More specifically, the nursery instrument 2000 comprises a seat body 2 and a base 4 rotatably and backwardly inclinably supporting the seat body 2. The seat body 2 includes a backrest portion 6, a seat portion 8 and a headrest 10. The seat body 2 includes side guards 2a and 2b, while the seat portion 8 includes armrests 8a and 8b.

Sleeping supports 12 and 14 are mounted on the side guards 2a and 2b to be slidable along and detachable from the side guards 2a and 2b.

A five-point safety belt is provided on the backrest portion 6 and the seat portion 8 for fixing an infant to the child seat 2000. This five-point safety belt, located on the crotch of the infant, includes a crotch belt 16 provided with a buckle 17 on its upper portion, lumbar belts 18 and 20, tongue plates 19 and 21 and shoulder belts 22 and 24.

The shoulder belts 22 and 24 are provided with a shoulder belt cover 25 for supporting the infant in a more preferable state. The backrest portion 6 is provided with shoulder belt through holes 6a for adjusting the vertical position of the shoulder belts 22 and 24 with respect to the infant.

The body of the base 4 is provided with a footrest step 26 and a control lever 28 for controlling rotation and backward inclination of the seat body 2.

The importance of the aforementioned selectivity for the bed face state in the child seat 2000 will now be described.

On the basis of the medical criteria for protecting the life of a baby, the development situations of the baby are classified as follows: In the medical criteria for this child seat, growth of a baby under the age of one is classified into three stages, i.e., <immediately after birth (neonatal infancy)>, <the neck is fixed (infancy)> and <capable of sitting alone (childhood)>. These three stages are based on SG standards (safety goods standards) applied to a baby carriage. In relation to <immediately after birth>, application to a baby under the age of two months after birth is not provided.

<Immediately After Birth (From Neonatal Infancy, Weight: From 2.5 kg)>

The average sleeping time in a day is about 18 to 22 hours.

The head is unstable, and the neck is not yet fixed.

The loin is also unstable.

The head is heavy (the weight of the brain is 400 g, and the size thereof is ¼)

The cranial bones are thin and soft.

The blood vessels are also so weak that the baby readily has an attack of intracerebral hemorrhage when strongly shaken.

The airway may be occluded depending on the baby's posture.

The baby makes abdominal respiration by swelling its abdomen.

The baby is readily frightened by stimulation by sound, light or vibration.

The hip joint is readily dislocated.

The baby remarkably develops in height and weight.

Figure 4:
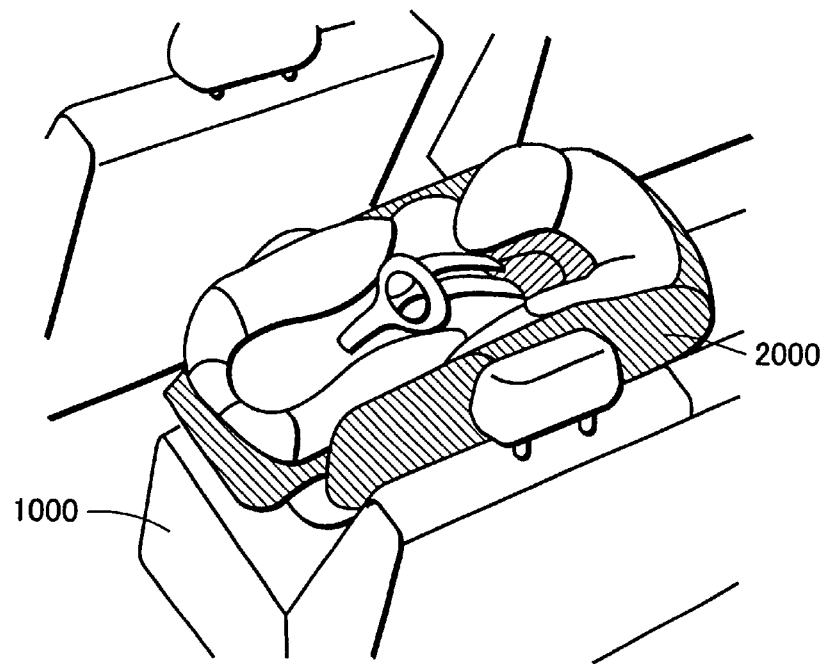
FIG. 4 is a diagram showing the child seat used as a neonatal bed.

Thus, a flat bed supporting the baby's neck straightforward, facilitating easy respiration and not pressing the baby's abdomen is employed as an infancy bed for the baby in neonatal infancy, with further employment of a neonatal pad employing a cushion structure not shaking the baby's body, particularly the baby's head in collision. As shown in FIG. 4, therefore, the child seat 2000 is preferably brought into the bed face state and used on a back seat 1000 of a car laterally to the traveling direction.

<After the Baby's Neck is Fixed (From Infancy (About Two or Three Months), Weight: From 5.5 kg)>

The average sleeping time in a day is about 16 to 20 hours.

The loin is still unstable.

The specific gravity of the head is still large as compared with the weight.

The cranial bones are still thin and soft.

The blood vessels are also so weak that the baby readily has an attack of intracerebral hemorrhage when strongly shaken.

The baby makes abdominal respiration by swelling its abdomen.

The baby gradually feels comfortableness of vibration and discomfort.

The baby remarkably develops in body and weight.

Figure 5:
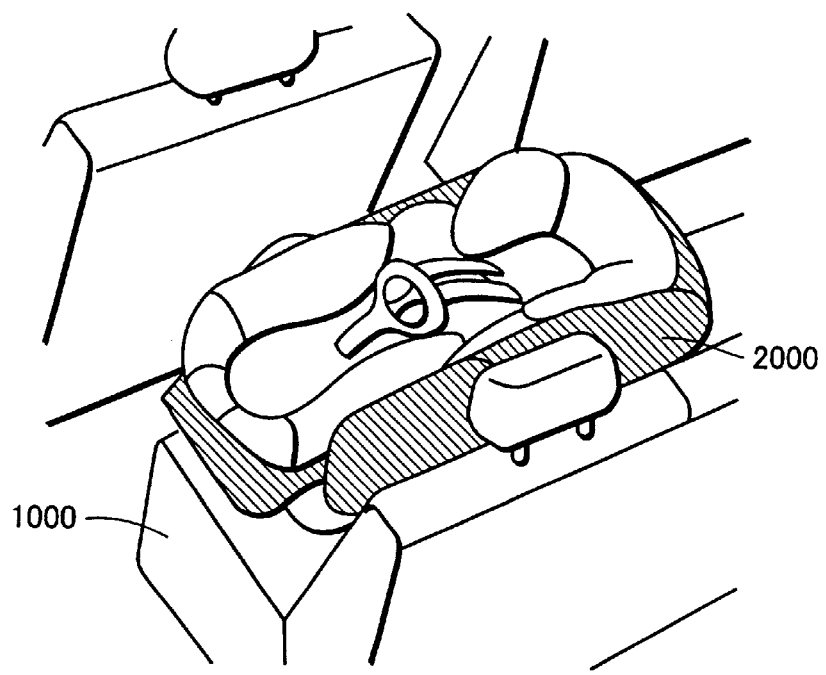
FIG. 5 is a diagram showing the child seat used as an infant bed.

Thus, a flat bed constructed to avoid shaking the heavy head of the baby and to avoid pressing the baby's abdomen in response to a collision, is employed as an infancy bed. More specifically, an infancy pad with a cushion structure is used to avoid strongly shaking the head and the body of the baby. Such pad is adjustable in response to the baby's growth. As shown in FIG. 5, therefore, the child seat 2000 is preferably brought into the bed face state and used on the back seat 1000 of the car laterally to the traveling direction.

<After the Baby Can Sit Alone (From Childhood (Six or Seventh Months), Weight: From 7.0 kg up to 10.0 kg)>

The average sleeping time in a day is about 12 to 13 hours.

The specific gravity of the head is still large as compared with the weight.

The cranial bones and the blood vessels are still weak as compared with those of an adult.

The baby is brisk in motion and dislikes inconvenient states of the limbs.

The baby is more comfortable in response to vibration and is more sensitive to discomfort.

The baby starts to be interested in outside scenes.

Figure 2:
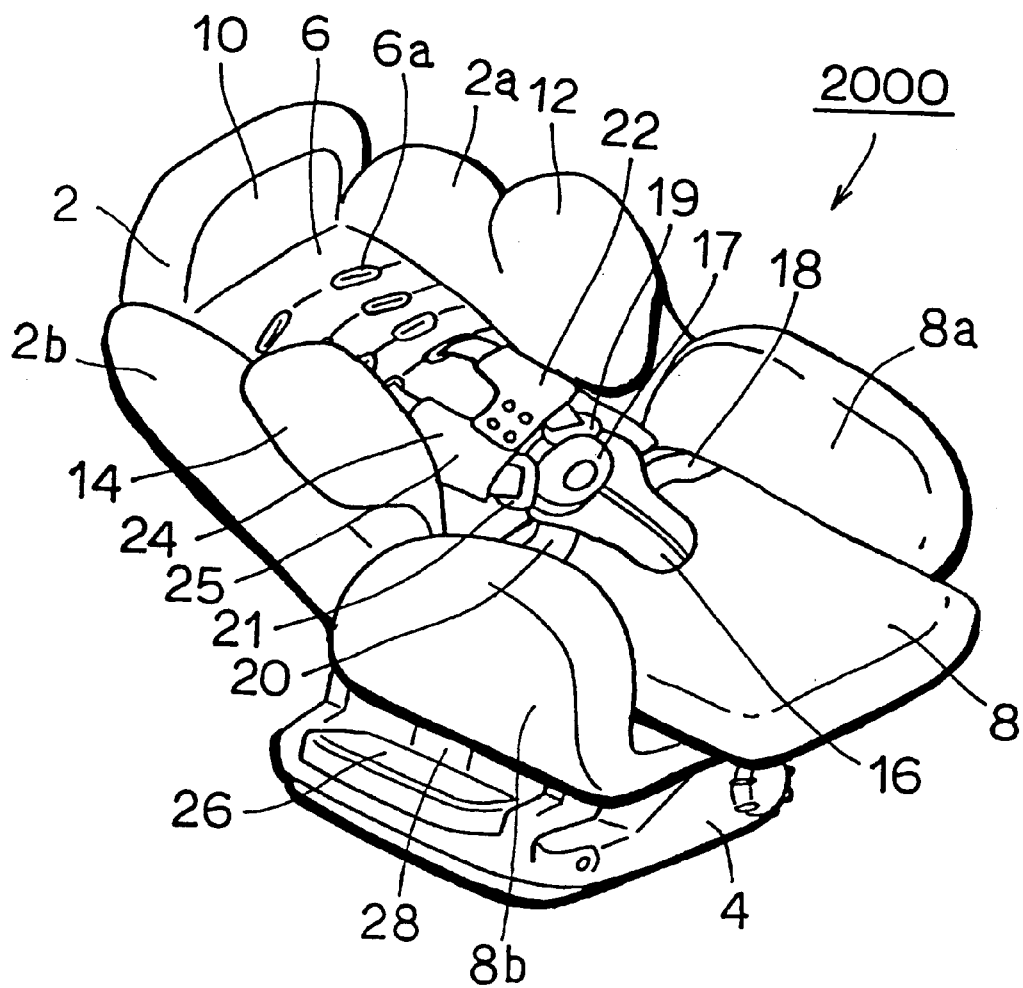
FIG. 2 is a general perspective view showing the structure of a child seat extended into an infant bed state.
Figure 3:
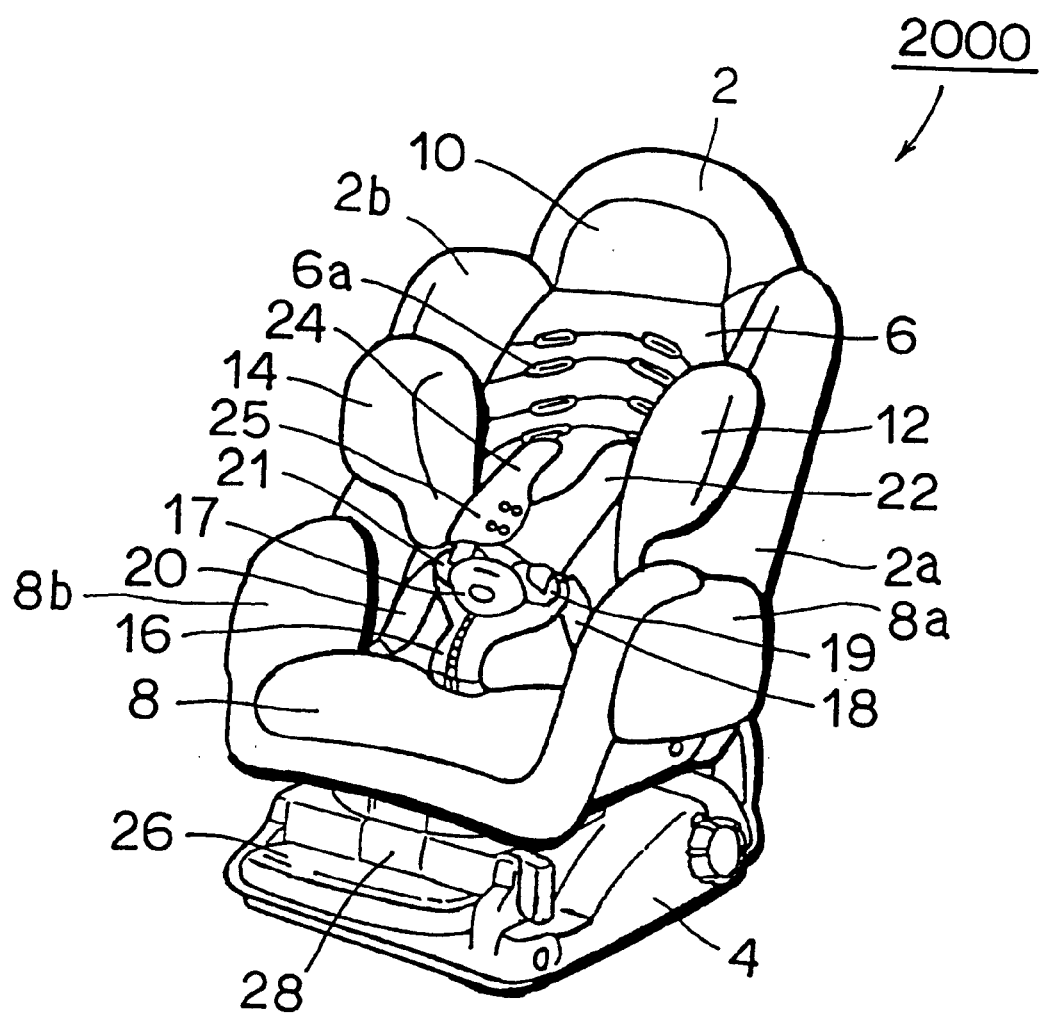
FIG. 3 is a general perspective view showing the structure of the child seat arranged to function as a seat.
Figure 6:
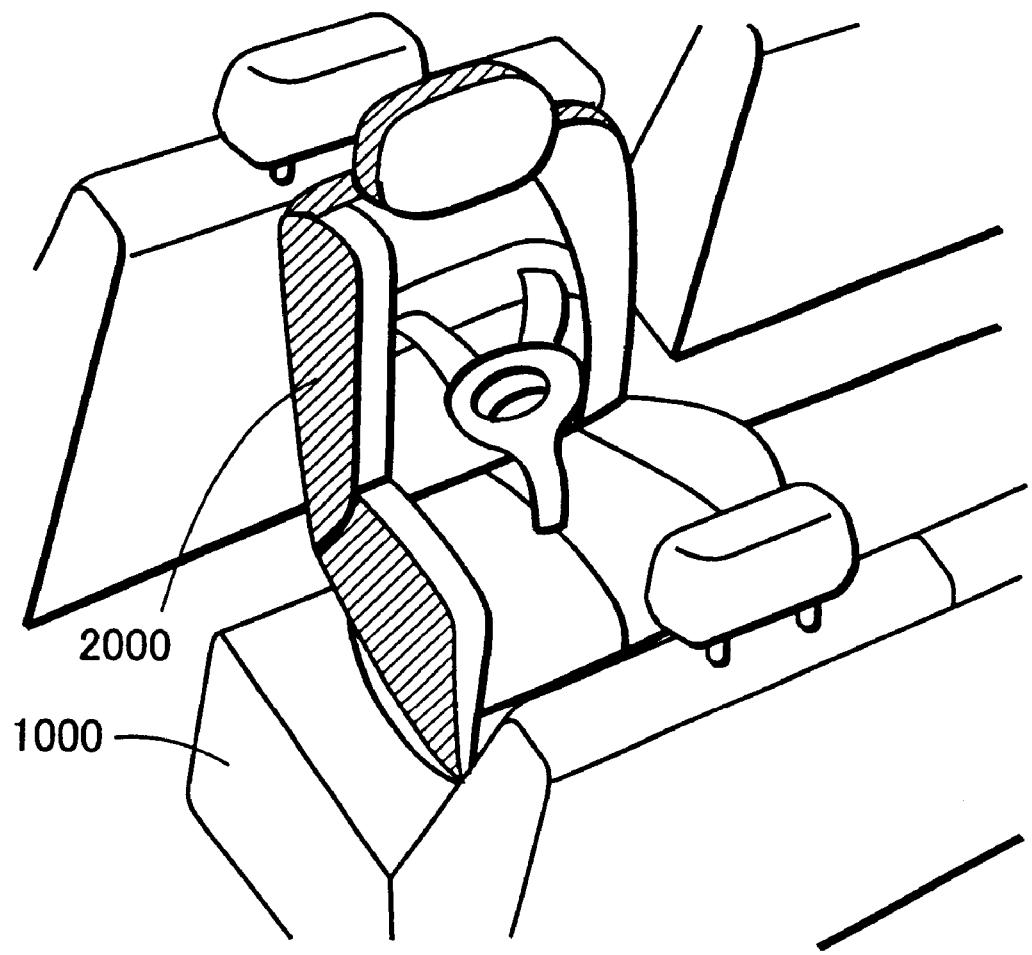
FIG. 6 is a diagram showing the child seat used as such.

Thus, the infancy bed in the state shown in FIG. 2 is preferably used as long as possible for the baby in infancy, who is still immature in cranial bones and cerebral blood vessels although the loin is fixed. Also in employment as an infancy seat, the child seat 2000 is preferably used on the back seat 1000 of the car backwardly to the traveling direction, as shown in FIG. 6.

In consideration of the above, the nursery instrument is preferably used in the bed face state at least for a baby in the aforementioned neonatal infancy or infancy, in order to allow abdominal respiration with no problem.

In relation to a nursery instrument allowing selection of a bed face state and a seat state, therefore, the present invention provides a nursery instrument having a mechanism capable of more reliably protecting a baby with a mechanism facilitating employment of the bed face state while inhibiting employment in the seat state for a baby in neonatal infancy or in infancy.

(Results of Study)

Figures 20, 21:
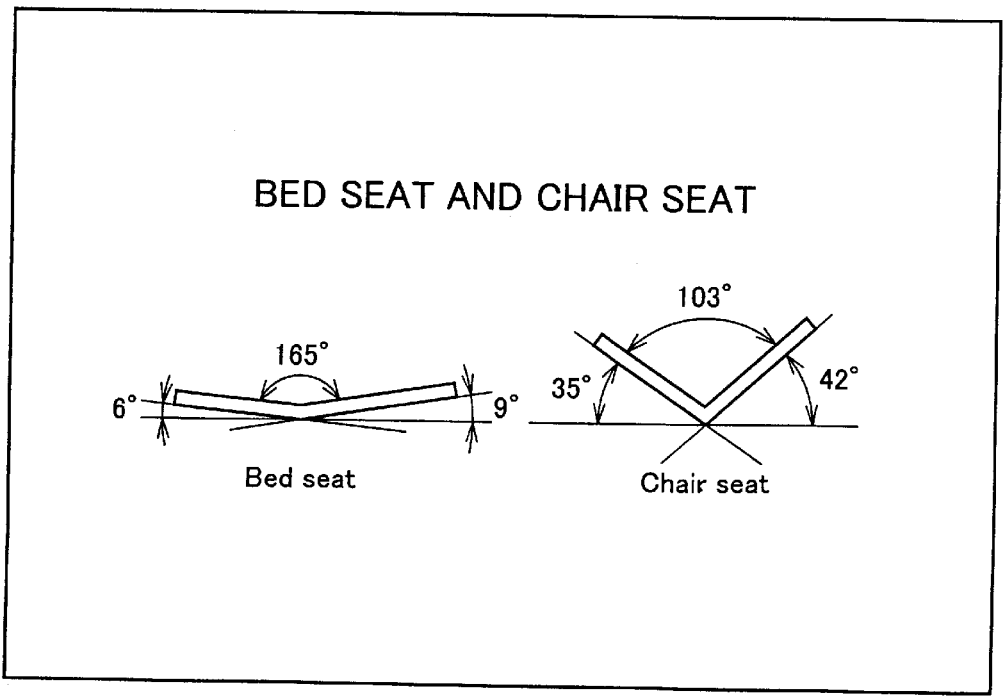
FIG. 20 is a diagram showing studied objects of a study for confirming a reduction in a percutaneous oxygen saturation ($SpO_2$).
FIG. 21 is a diagram illustrating the shapes of a bed seat and a chair seat employed for the study.

Results of study confirming reduction of percutaneous oxygen saturation ($SpO_2$) of neonates in the bed face state and the seat state are now described. As to studied objects, this study was directed to 12 neonates, as shown in FIG. 20. FIG. 20 shows the birth weight (g), the number of gestational weeks (W) and the age in day (days) of each neonate. FIG. 21 shows the shapes of a bed seat and a chair seat employed for the study.

Figures 22, 23:
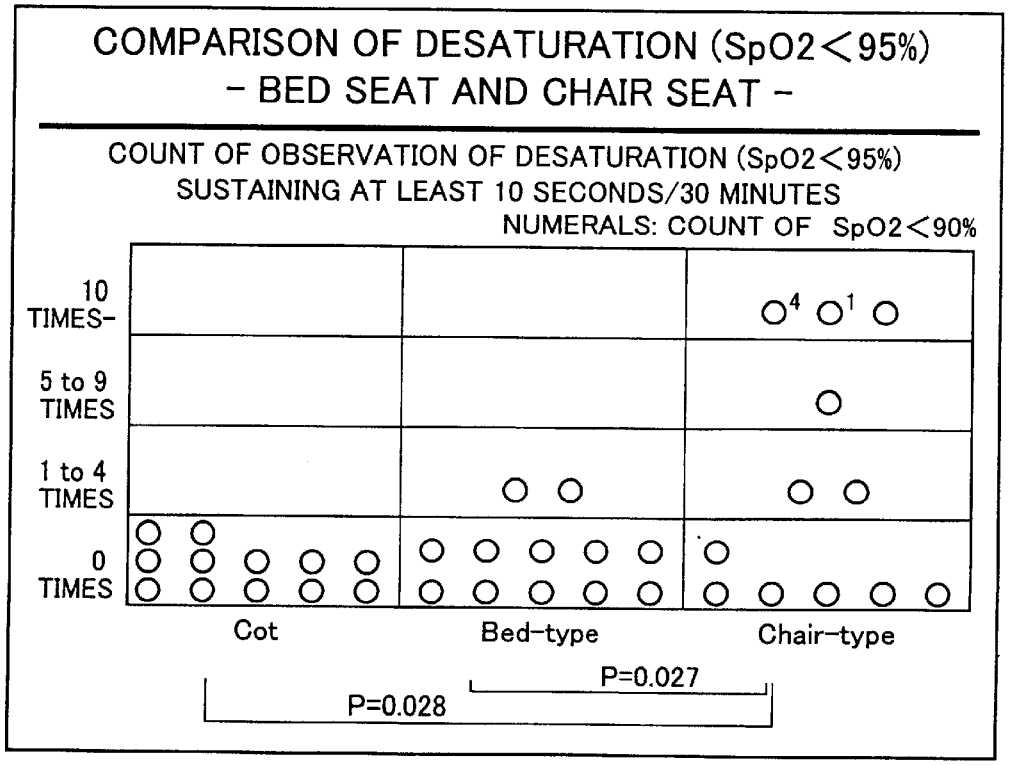
FIG. 22 is a first diagram showing states where the percutaneous oxygen saturation ($SpO_2$) levels of the studied objects are not more than 95%.
FIG. 23 is a second diagram showing the states where the percutaneous oxygen saturation ($SpO_2$) levels of the studied objects are not more than 95%.

In this study, each neonate was laid on each of the bed seat, the chair seat and a neonatal cot on its back, for observing it for 30 minutes after a lapse of 30 minutes to 60 minutes from suckling and measuring percutaneous oxygen saturation ($SpO_2$). FIGS. 22 and 23 show the results of this measurement.

In this measurement, times continuously exhibiting percutaneous oxygen saturation ($SpO_2$) levels of less than 95% were measured. As shown in FIG. 23, low percutaneous oxygen saturation ($SpO_2$) states of 20 times/30 minutes, 18 times/30 minutes, 17 times/30 minutes, nine times/30 minutes, three times/30 minutes and once/30 minutes were measured as to the neonates with the names "H. A.", "R. Y.", "S. A.", "F. U.", "I. M." and "S. G." respectively. In particular, the neonate with the name "H. A." was in states exhibiting percutaneous oxygen saturation ($SpO_2$) levels of less than 90% four times among, the 20 times, and the neonate with the name "R. Y." was in a state exhibiting a percutaneous oxygen saturation (SpO$_2$) level of less than 90% once among the 18 times.

FIG. 23 collectively shows the measurement data of all neonates. It is understood that the states exhibiting percutaneous oxygen saturation (SpO$_2$) levels of less than 95% were more frequently observed in the chair seat as compared with the bed seat.

In conclusion, reduction of percutaneous oxygen saturation (SpO$_2$<95%) over 10 seconds was never recognized in the cot, while the bed seat and the chair seat exhibited significantly high ratios of once in two examples and six in 12 examples respectively. Therefore, careful observation is conceivably necessary when laying a neonate on a chair seat.

(First Embodiment)

An exemplary nursery instrument according to a first embodiment of the present invention applied to a child seat is now described with reference to drawings. First, the structure of the child seat according to this embodiment is described with reference to FIGS. 7 to 8.

While the surfaces of members forming a child seat 1 are originally covered with a member of urethane foam, for example, for absorbing shocks, the child seat 1 according to this embodiment is described with no illustration of a urethane foam member, in order to facilitate easy understanding of the structure of the child seat 1.

<Structure>

First, the schematic structure of the child seat 1 is described with reference to FIGS. 7 and 8. This child seat 1 has a backrest unit 1A, a seat unit 1B and a support base 1C.

The seat unit 1B has a sea t portion 16. The backrest unit 1A has a backrest portion 11 inclinably coupled to the rear end of the seat portion 16 through hinge members 18. A pair of side guards 12 and 13 extending substantially vertically upright with respect to the backrest portion 11 are provided on both sides of the backrest portion 11. A head guard 10 is coupled through hinge members 19a to the upper end of the backrest portion 11, whereby the head guard 10 can be tilted into an upright position as shown in FIG. 7 or into a backrest aligned position as shown in FIG. 8.

The seat unit 1B has a pair of armrests 14 and 15 arranged to approach the inner sides of the pair of side guards 12 and 13 and a coupling plate (not shown) coupling the lower ends of the pair of armrests 14 and 15 with each other. The base 1C holds the seat unit 1B with a holder (not shown) to be substantially horizontally rotatable.

While this child seat 1 is provided with a safety belt for tightly holding an infant held by this child seat 1, this is not an essential part of the present invention and hence illustration and detailed description thereof are omitted.

The backrest unit 1A and the seat unit 1B are coupled with each other through pin bolts 34, washers 35 and nuts 36 to couple bolt holes 33 provided on the pair of armrests 14 and 15 as support points and bolt holes 37 provided on the pair of side guards 12 and 13 as support points with each other.

The pair of side guards 12 and 13 and the pair of armrests 14 and 15 are so arranged as to partially overlap with each other in the vicinity of the bolt holes 33 and the bolt holes 37.

According to this structure, the infant's sides are protected by at least a double structure formed by the side guards 12 and 13 and the armrests 14 and 15, whereby the safety is improved against collision of a car particularly when the child seat 1 is used in a transverse bed face state.

The seat portion 16 is provided on both side surfaces thereof with guide projections 16a and 16b, which are mounted to engage with guide grooves 32 of blocks provided inside the armrests 14 and 15. Thus, when the backrest portion 11 of the seat unit 1B rotates frontward about the pin bolts 34, the seat portion 16 gradually retreats backward along the guide grooves 32.

Figure 7:
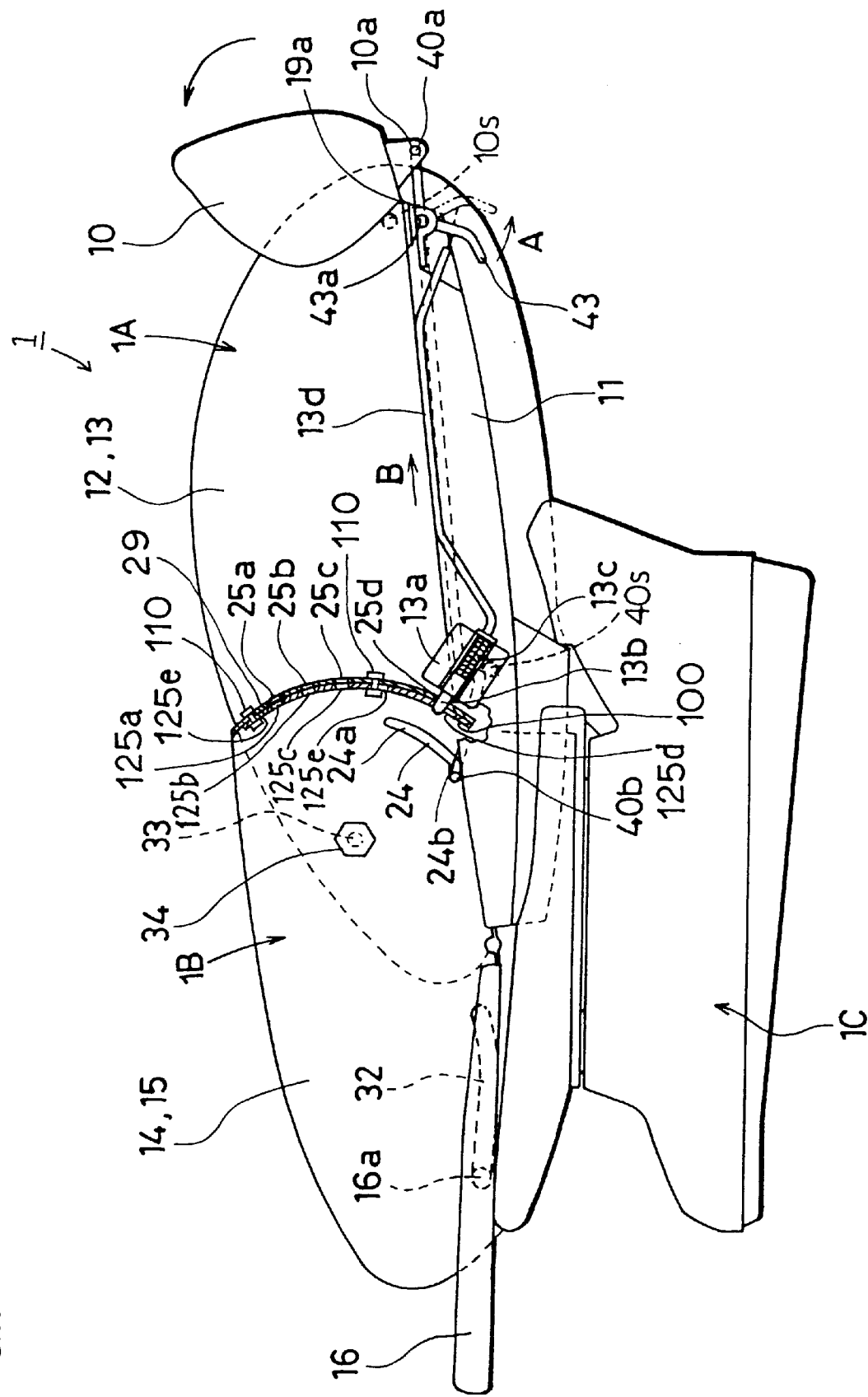
FIG. 7 is a first side elevational view showing a bed face state of a child seat according to a first embodiment.
Figure 8:
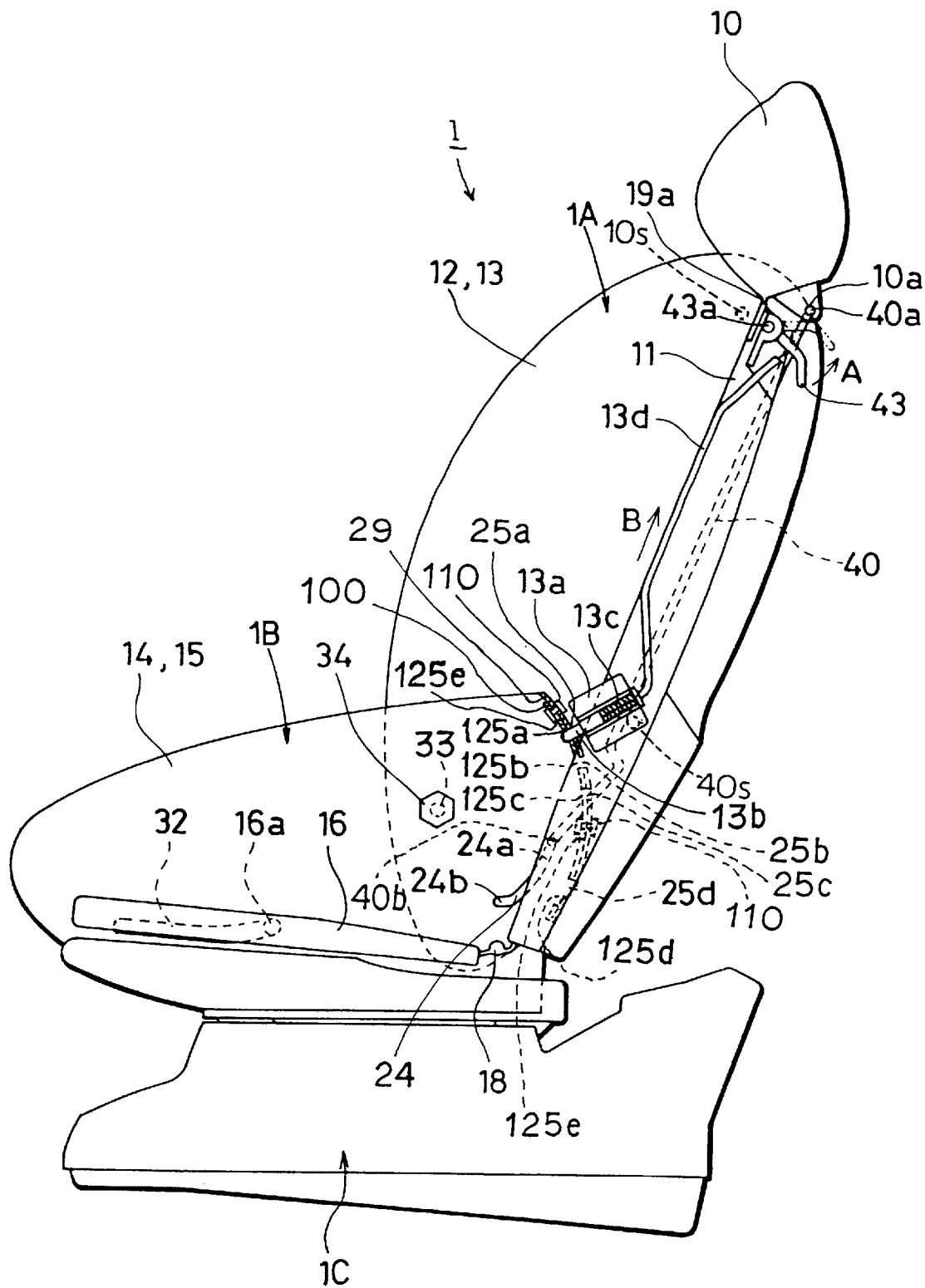
FIG. 8 is a side elevational view showing a seat face state of the child seat according to the first embodiment.

Engaging pins 13b for adjusting the angle of inclination of the backrest portion 11 are mounted on fixed plates 13a inside the side guards 12 and 13, and springs 13c urge the engaging pins 13b to normally project frontward into engagement wit a hole, e.g. 25d shown in FIG. 7. First ends of wires 13d are connected to the rear ends of the engaging pins 13b, while reclining levers 43 provided on the back surface of the backrest 11 through openings 11a provided in the backrest portion 11 are connected to second ends of the wires 13d. Thus, moving the lever or levers 43 about pivot 43a in the direction of the arrow A against the force of the spring 13c moves the wire 13d in the direction of the arrow B and the pin 13B out of the hole 25d.

Figure 10:
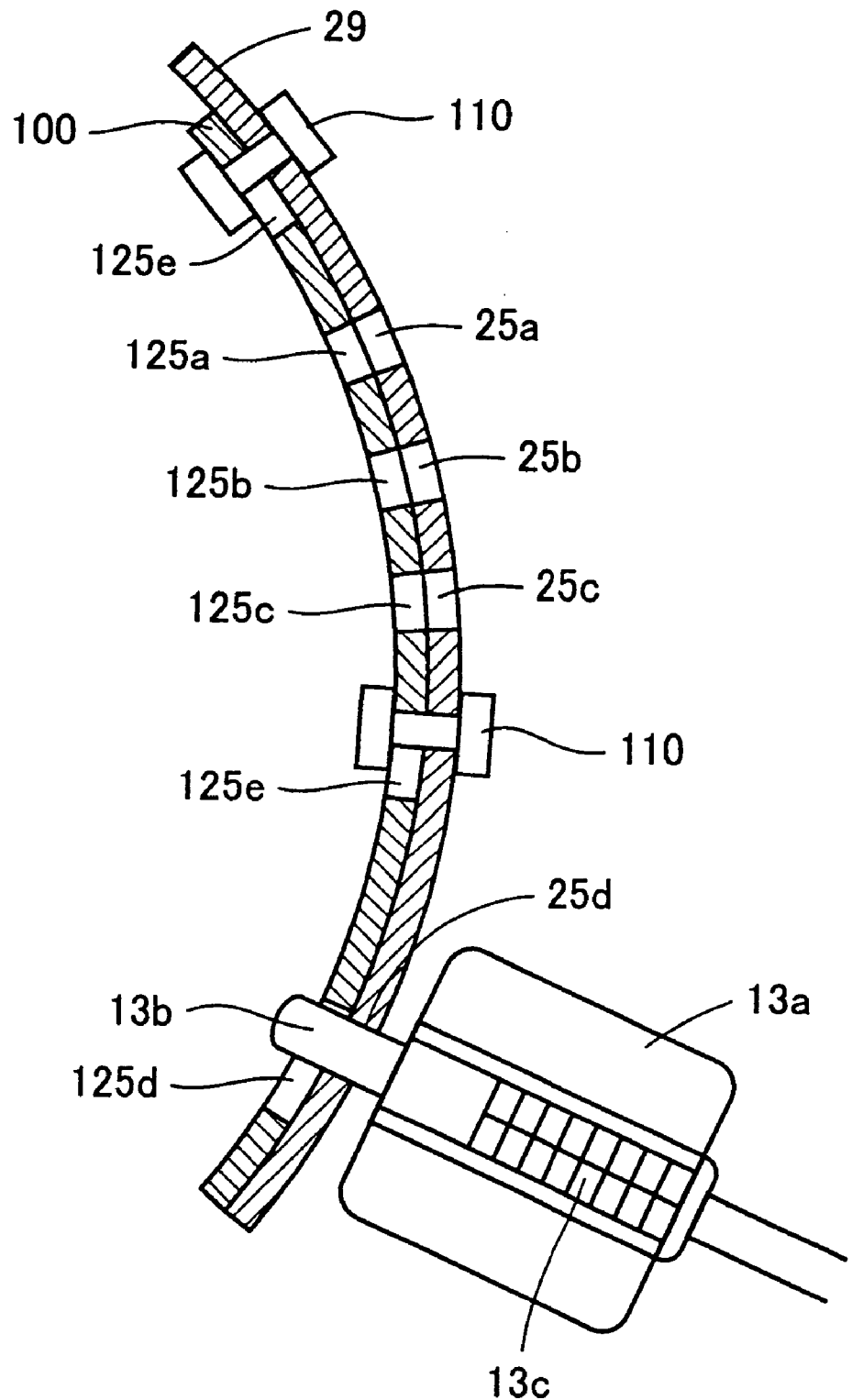
FIG. 10 is a first sectional view showing the relation between a reinforcing plate 29 and a selection plate 100.

Referring to FIG. 10, engaging holes 25a, 25b, 25c and 25d for receiving the aforementioned engaging pins 13b are provided on the rear ends of the pair of armrests 14 and 15. The engaging holes 25a to 25d are provided on metal reinforcing plates 29, which are mounted on the rear ends of the pair of armrests 14 and 15.

Selection plates 100 provided with through holes 125a, 125b, 125c and 125d on positions corresponding to the engaging holes 25a, 25b, 25c and 25d are provided on the front surfaces of the reinforcing plates 29. As shown in the enlarged sectional view of FIG. 10, the selection plates 100 are fixed to the reinforcing plates 29 by pins 110, to be slidable through slots 125e. The through holes 125a, 125b and 125c are identical in bore diameter to the engaging holes 25a, 25b and 25c, while the through holes 125d consist of slots having a length of about twice that of the engaging holes 25d in the sliding direction.

Referring again to FIGS. 7 and 8, link bars 40 couple the head guard 10 with the pair of armrests 14 and 15, while first ends 40a of the link bars 40 are rotatably coupled to a lower end 10a of the head guard 10 and second ends 40b of the link bars 40 rotatably and slidably engage with link guide slots 24 provided on the rear ends of the armrests 14 and 15. The head guard 10 is rotatably supported on the upper end of the backrest portion 11 by the hinge portions 19a fixed to the backrest portion 11 by pins 43a.

<Adjustment of Angle of Inclination>

When the selection plates 100 are on the position shown in FIGS. 7 and 10 (when the selection plates 100 are located on the lowermost position) with respect to the reinforcing plates 29, all engaging holes 25a, 25b, 25c and 25d are opened. In this case, therefore, the engaging pins 13b can be inserted in any of the engaging holes 25a to 25d, and hence the angle of backward inclination of the backrest portion 11 can be selected in either the state forming the bed face by most inclining the backrest portion 11 as shown in FIG. 7 or a state of a seat face most uprighting the backrest portion 11 as shown in FIG. 8, or an intermediate stage.

Figure 9:
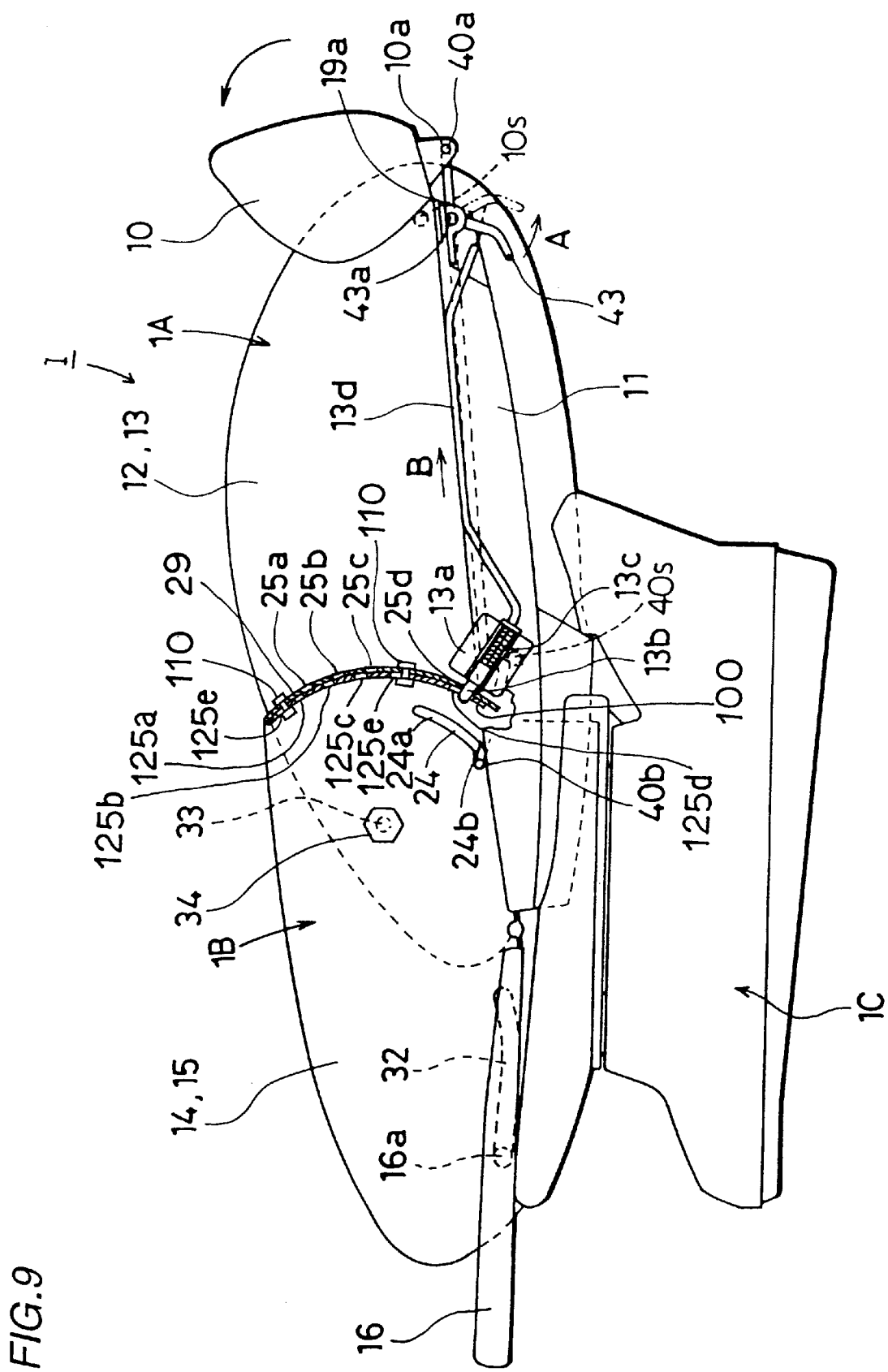
FIG. 9 is a second side elevational view showing the bed face state of the child seat according to the first embodiment.
Figure 11:
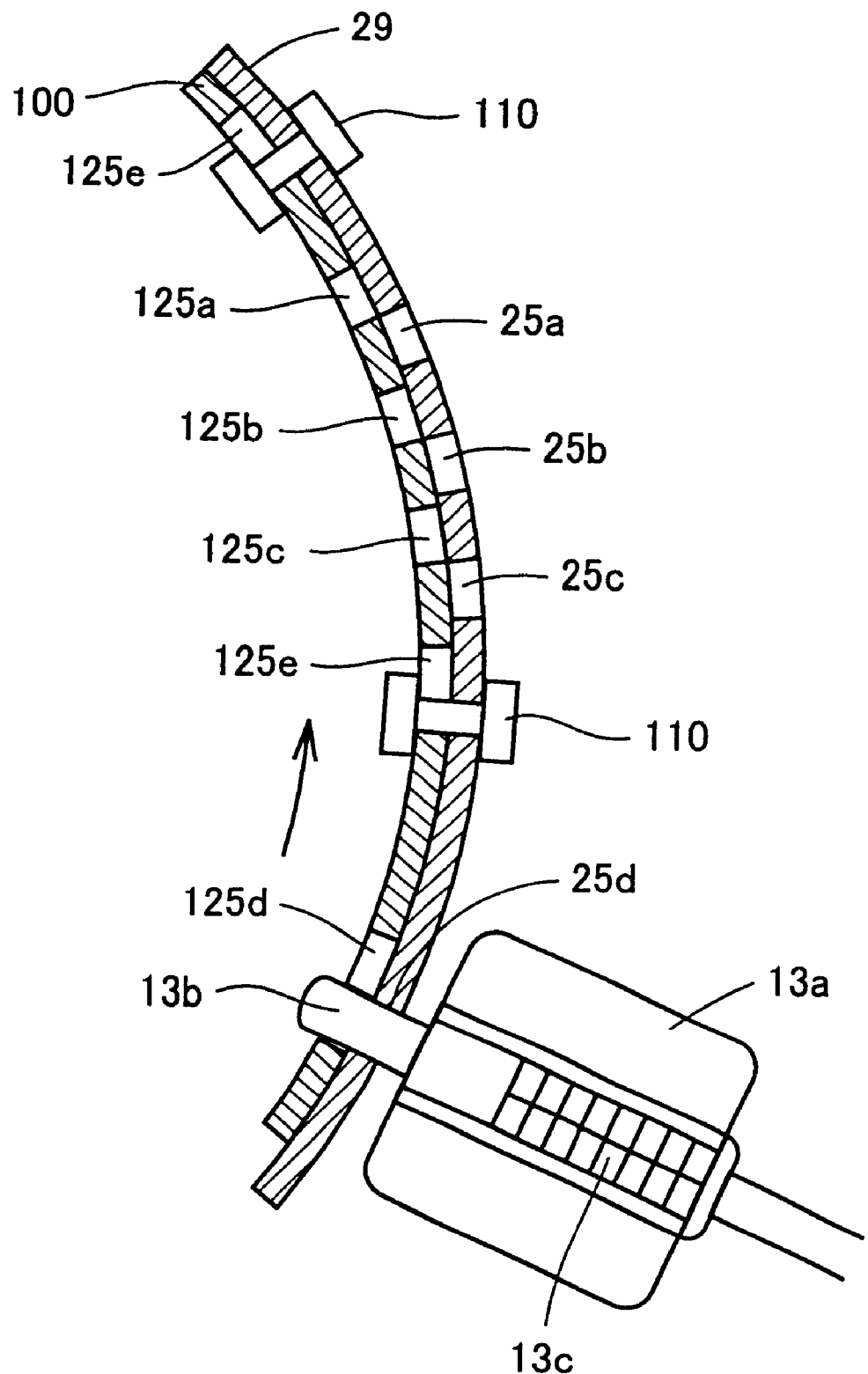
FIG. 11 is a second sectional view showing the relation between the reinforcing plate 29 and the selection plate 100.

When the selection plates 100 are on the position shown in FIGS. 9 and 11 (when the selection plates 100 are located on the uppermost position) with respect to the reinforcing plates 29, all engaging holes 25a, 25b and 25c are closed while only the engaging holes 25d are opened. Consequently, the child seat 1 can assume only the state of forming the bed face most inclining the backrest portion 11, as shown in FIG. 9.

When this mechanism is employed, only the bed face state can be selected until a constant period elapses after the birth of the baby, whereby the child seat regularly provides the bed face state for the baby during this period, to avoid pressure on the abdomen of the baby. Thus, reduction of percutaneous oxygen saturation (SpO$_2$<95%) can be prevented.

(Second Embodiment)

The structure of a child seat according to a second embodiment is now described with reference to FIGS. 12 to 14. As to the basic structure, this child seat has the same mechanism as the child seat 1 according to the aforementioned first embodiment, and hence only different points are described.

The child seat according to this embodiment improves the shape of reinforcing plates 29 in place of providing the selection plates 100, and further enables adjustment of the projection lengths of the engaging pins 13b.

More specifically, engaging holes 55d are provided in the reinforcing plates 29 the same positions as the engaging holes 25d in the first embodiment. However, the engaging holes 55a, 55b and 55c are in different positions which still permit selective cooperation with the engaging pins 13b.

Figure 14:
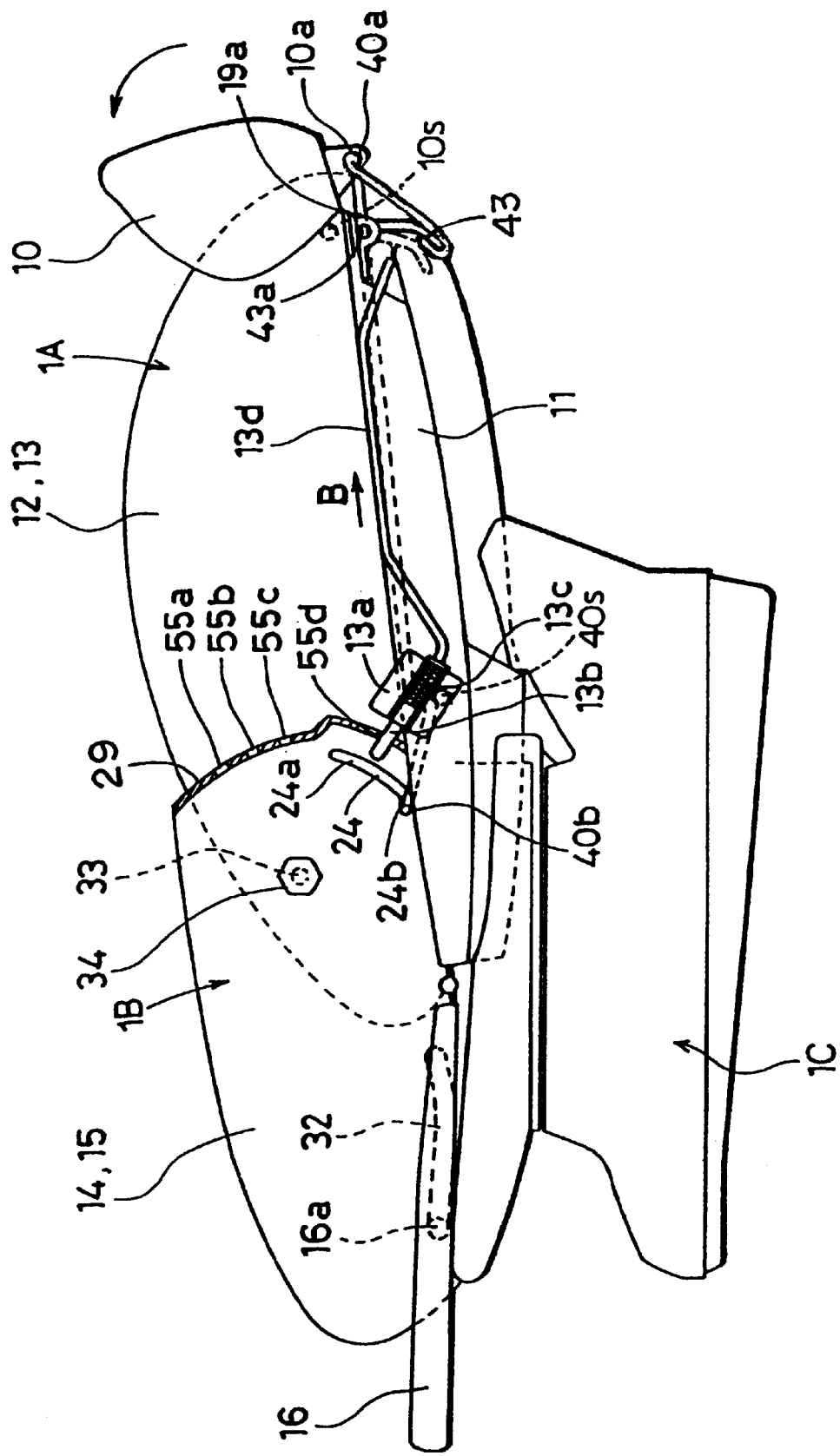
FIG. 14 is a second side elevational view showing the bed face state of the child seat according to the second embodiment.

FIG. 14 shows caps 150 mounted to the reclining levers 43 for limiting the movement of the reclining levers 43 so that the projecting length of the engaging pins 13b is at a distance sufficient for engaging the holes 55d but insufficient for engaging the engaging holes 55a, 55b and 55c.

Figure 12:
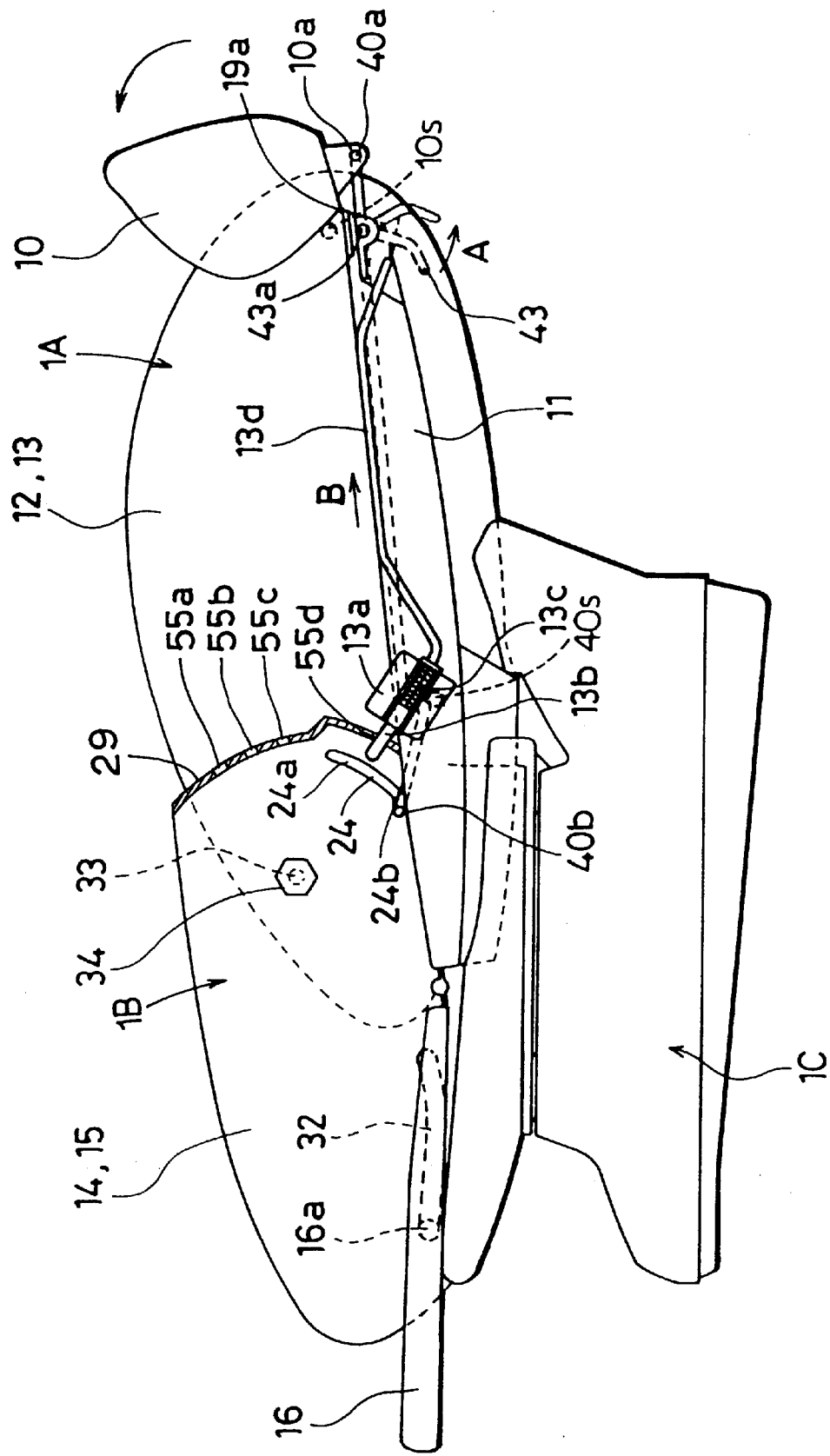
FIG. 12 is a first side elevational view showing a bed face state of a child seat according to a second embodiment.
Figure 13:
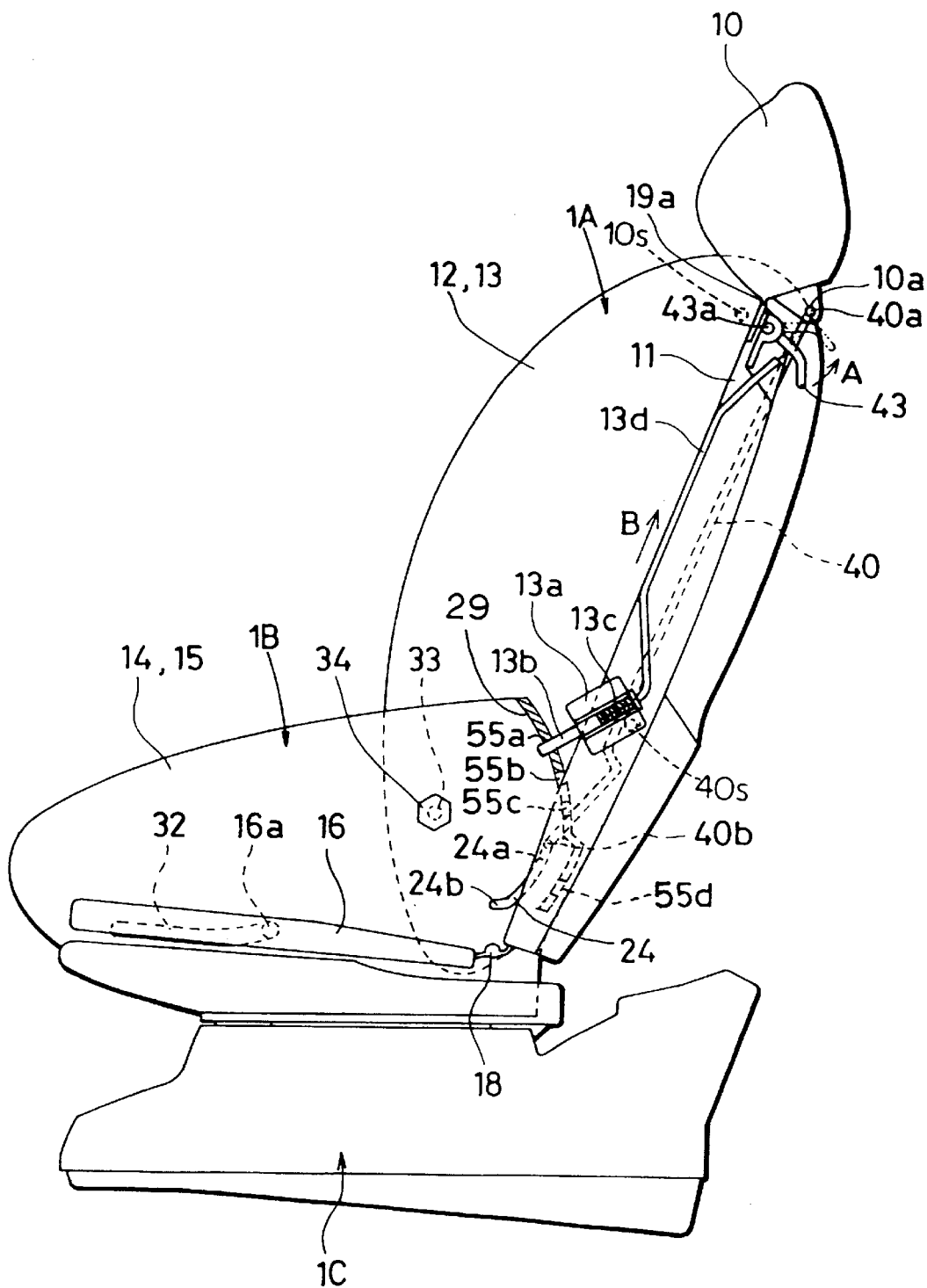
FIG. 13 is a side elevational view showing a seat face state of the child seat according to the second embodiment.

When the caps 150 are removed from the reclining levers 43, either a bed face state shown in FIG. 12 or a seat face state shown in FIG. 13 or an intermediate stage can be selected.

Figure 15:
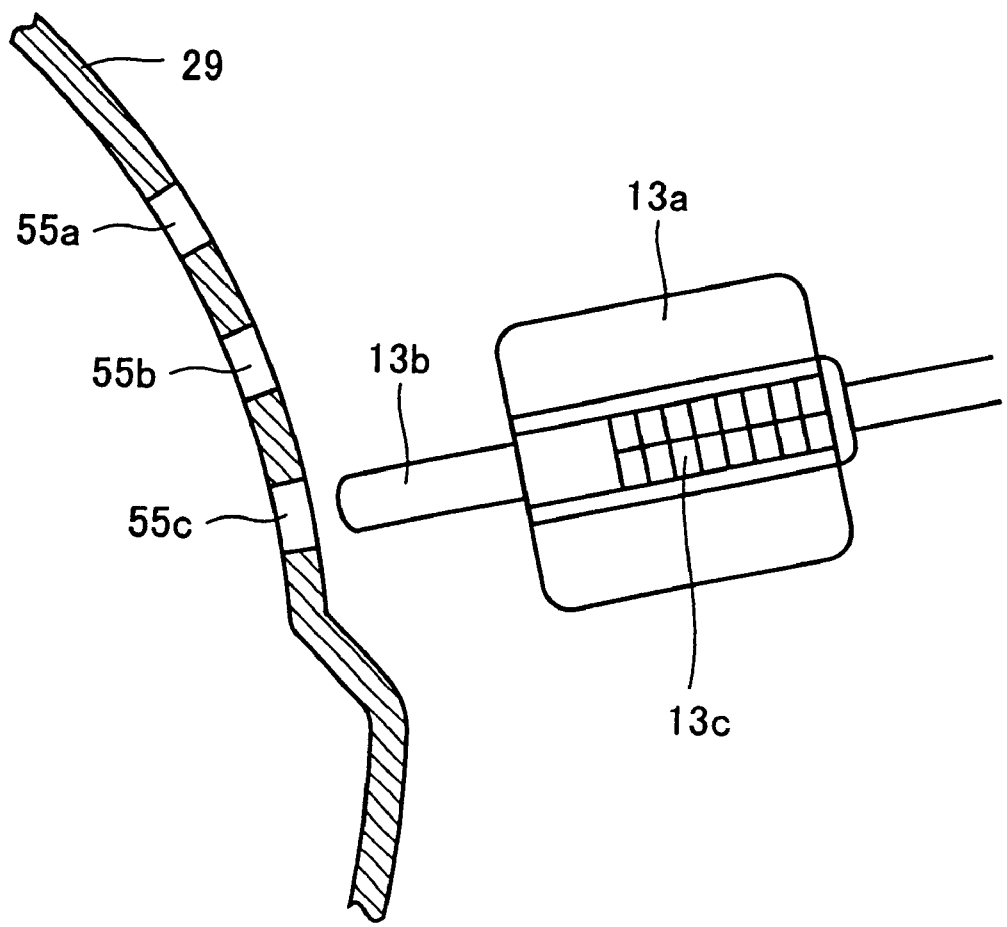
FIG. 15 is an enlarged sectional view showing the relation between engaging holes 55a, 55b and 55c and an engaging pin 13b.

When the caps 150 are mounted to the reclining levers 43, only the bed face state is selected as shown in FIG. 14 and the engaging pins 13b do not engage with the engaging holes 55a, 55b and 55c as shown in FIG. 15, and hence no other states can be selected, except the bed state.

Therefore, also the child seat according to this embodiment can select only the bed face state until a constant period elapses after birth of a baby, whereby the child seat regularly provides the bed face state for the baby during this period, thereby preventing pressure on the abdomen of the baby. Thus, a reduction of the percutaneous oxygen saturation ($SpO_2 < 95\%$) can be prevented.

When the caps 150 are removed, the engaging pins 13b can engage any one of the engaging holes 55b or 55c while not engaging with the engaging holes 55a and 55d for adjusting the angular position of the backrest 11. For example, in FIG. 13, pins 13b engage holes 55a to hold the backrest 11 in a substantially upright position.

(Third Embodiment)

An exemplary nursery instrument according to a third embodiment of the present invention applied to a baby carriage is now described with reference to FIGS. 16A to 19 of the drawings. First, a reclining mechanism for the baby carriage according to this embodiment is described with reference to FIGS. 16A and 16B.

<Reclining Mechanism>

Figures 16A, 16B:
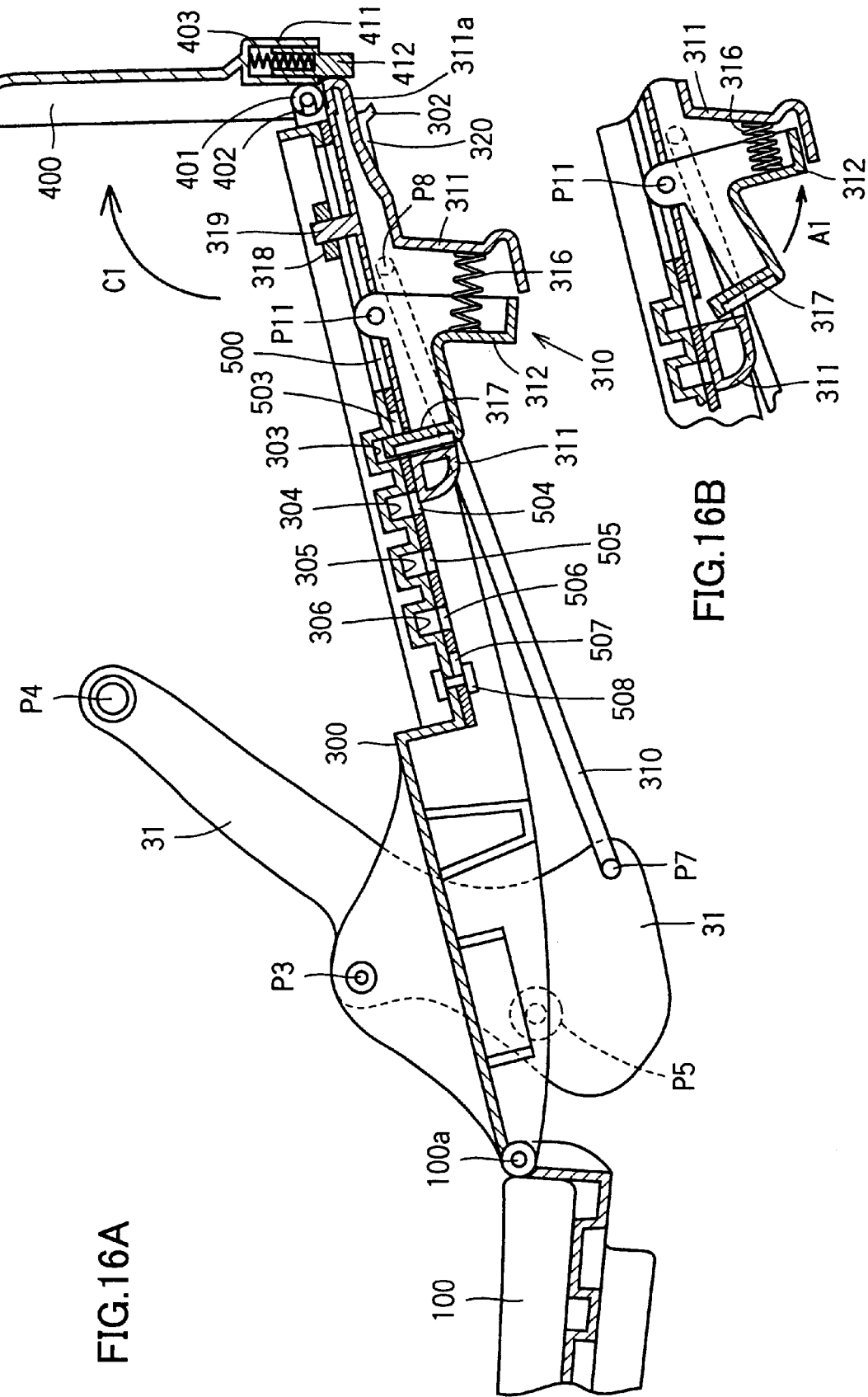
FIG. 16A is a first side elevational view showing a bed face state of a baby carriage according to a third embodiment.
FIG. 16B is an enlarged view of an angle controller 310.
Figure 17:
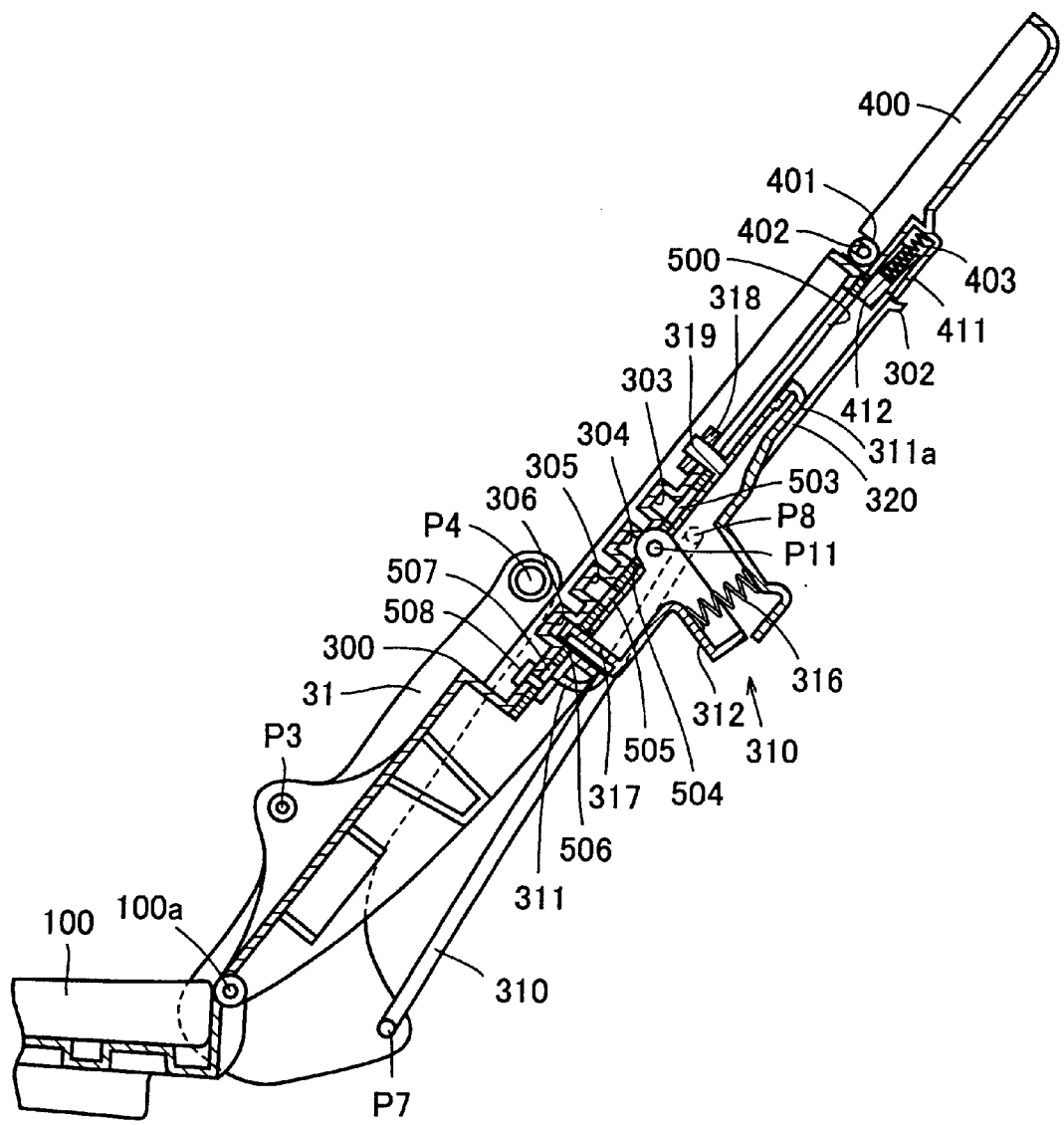
FIG. 17 is a side elevational view showing a seat face state of the baby carriage according to the third embodiment.

Referring to FIGS. 16A and 16B, a backrest portion 300 is rotatably supported with respect to a support plate 31 by a pivot shaft P3 in this baby carriage having a reclining mechanism. A head guard 400 is rotatably mounted on the upper end of the backrest portion 300 by hinge portions 401, while a seat portion 100 is rotatably mounted on the lower end of the backrest portion 300 by hinge portions 100a. Coil springs 402 are inserted in the hinge portions 401, for regularly supplying an external force to the head guard 400 in the direction shown by arrow C1 in FIGS. 16A and 16B so that the head guard 400 is flush with the backrest portion 300 as shown in FIG. 17. Tilting of the head guard into the position shown in FIGS. 16A and 18 will be described below.

An angle controller 310 is provided on the back surface of the backrest portion 300 for controlling the angle of inclination of the backrest portion 300. This angle controller 310 includes an angle control plate 311. The angle control plate 311 has a guide pin 319, projecting toward the front surface of the backrest portion 300. The guide pin 319 is fixed by a retaining ring 319 for vertically slidably supporting the angle control plate 311 and to prevent displacement of the plate 311 from the backrest portion 300.

The angle control plate 311 has a slide pin 311a extending toward the head guard 400. The pin 311a is slidable along a slide groove 320 provided on the back surface of the backrest portion 300.

A lock lever 312 serving as a locking mechanism is provided on the angle control plate 311. The lever 312 is rotatable about a pivot shaft P11, and a coil spring 316 is provided between the lock lever 312 and the angle control plate 311 for normally urging the lock lever 312 in a locking state.

The lock lever 312 is provided with a lock plate 317 receivable in any of a plurality of locating engaging holes 303 to 306 vertically provided on the back surface of the backrest portion 300. FIG. 16A shows the baby carriage locked with the lock plate 317, and FIG. 16B shows the baby carriage released from the state locked with the lock plate 317.

An angle selection plate 500 is provided between the back surface of the backrest portion 300 and the angle control plate 311. The selection plate 500 is slidably fixed to the backrest portion 300 through a slot 507 with a pin 508.

The selection plate 500 is provided with through holes 503, 504, 505 and 506, and the through holes 504, 505 and 506 are identical in size to the locating engaging holes 304, 305 and 306 while the through hole 503 is about twice the locating engaging hole 303 in length along the sliding direction.

Figure 18:
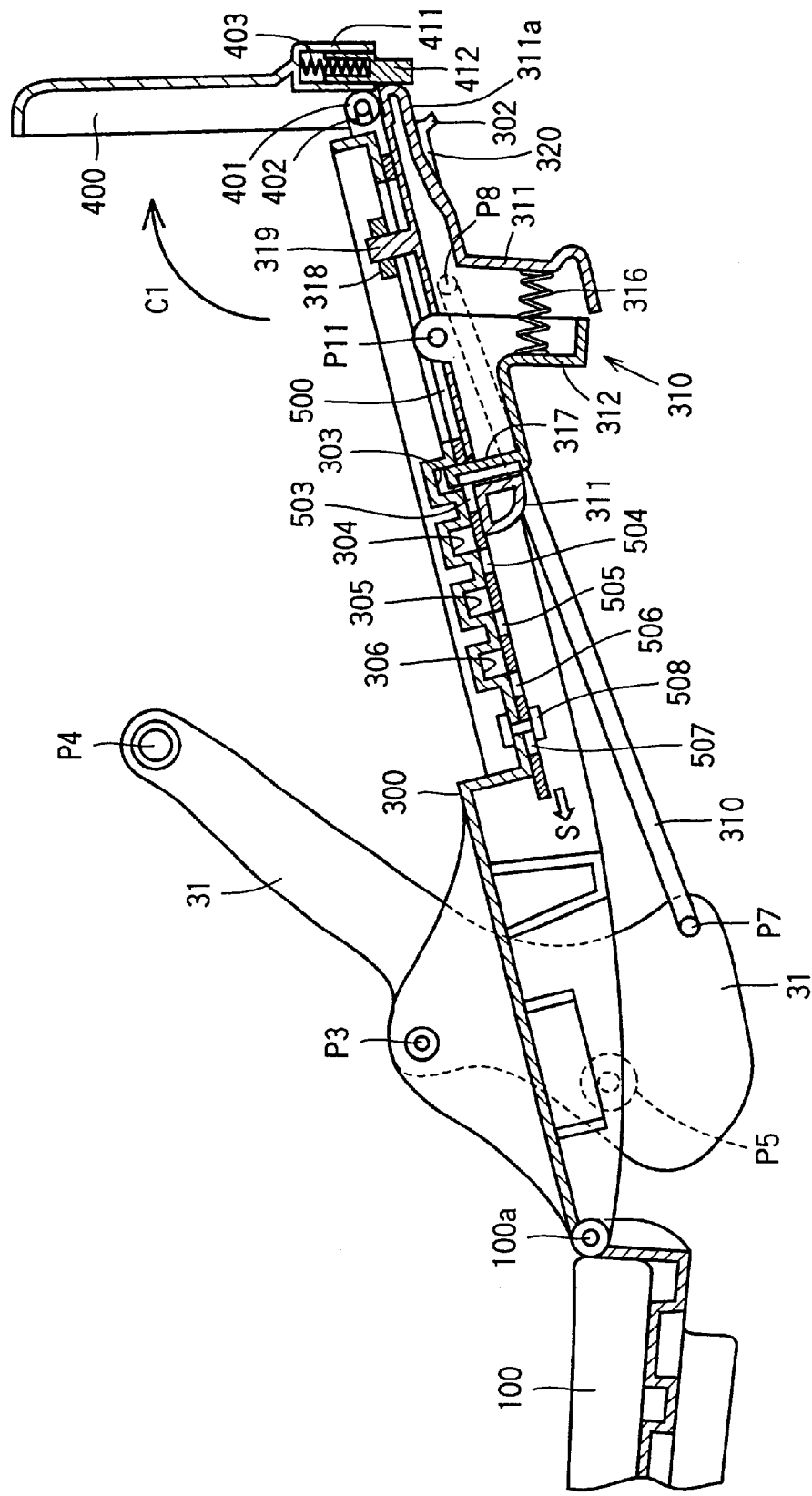
FIG. 18 is a second side elevational view showing a bed face state of the baby carriage according to the third embodiment.

The hinge portions 401 of the head guard 400 are provided with contact pins 412, cavities 411 for storing the contact pins 412 and coil springs 413 supplying external force for normally projecting the contact pins 412 out of the cavities 411 to hold the head guard 400 in a position shown in FIGS. 16A and 18.

Projections 302 are provided on the end of the back surface of the backrest portion 300 coming into contact with the head guard 400, for guiding the contact pins 412 into a storage recess 320. The contact pins 412 are supported by means (not shown), for holding the pins 412 in the cavities 411.

A boom 310 is hinged between the support plate 31 and the angle control plate 311, to be rotatable about hinge shafts P7 and P8, respectively.

<Reclining Operation>

When the selection plate 500 is located in its uppermost position shown in FIGS. 16A, 16B and 17 with respect to the angle control plate 311, all locating positioning holes 303 to 306 are opened. Thus, the lock plate 317 is receivable in any one of the locating engaging holes 303 to 306, and hence the angle of backward inclination of the backrest portion 300 can be set to select either the bed position which is the most inclined position of the backrest portion 300 as shown in FIGS. 16A and 16B or the seat position wherein the backrest portion 300 assumes its most upright position as shown in FIG. 17, or an intermediate stage.

When the selection plate 500 is located in the lowermost position shown in FIG. 18, the locating engaging holes 304 to 306 are closed and only the locating engaging hole 303 is opened. Consequently, only the bed face state most inclining the backrest portion 300 can be selected.

This selection of the bed state is maintained until a constant period has elapsed after the birth of a baby, and hence the baby carriage regularly provides the bed face state to the baby, to avoid pressure on the abdomen of the baby. Thus, reduction of percutaneous oxygen saturation ($SpO_2<95\%$) can be prevented.

Figure 19:
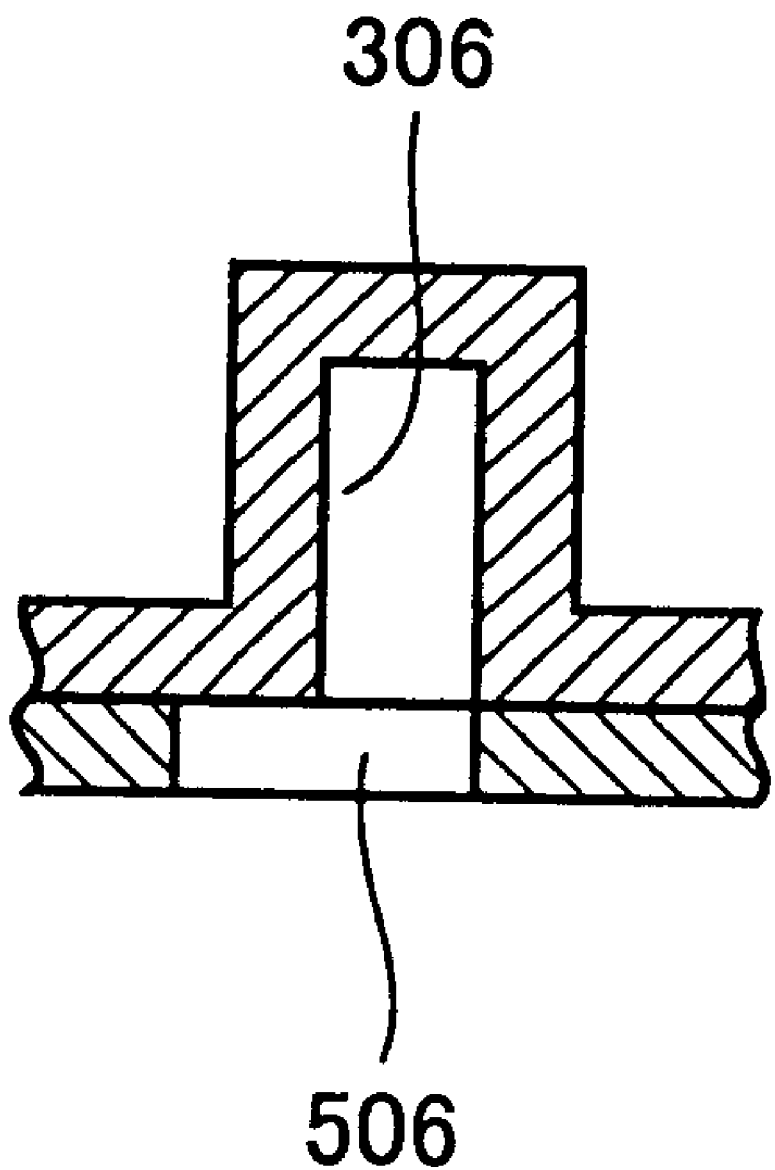
FIG. 19 is a sectional view showing another mode of a through hole 506.

The baby carriage may employ a foldable mechanism. In order to fold the baby carriage, the backrest portion 300 must be fixed in the most uprighted state. In this case, the through hole 506 is identically shaped as the through hole 503 as shown in FIG. 19, thereby enabling fixation of the backrest portion 300.

While the mechanism enabling selection of the most inclined state of the backrest portion thereby preventing the selection of the remaining states has been described with reference to each of the aforementioned embodiments, a mechanism for keeping the bed face state by fixing the backrest portion in the bed face state to the armrests is also usable. For example, pins may be inserted into overlapping portions of the backrest portion and the armrests, or plates may be provided to extend over the backrest portion and the armrests.

While the aforementioned embodiments have been applied to child seats and a baby carriage as exemplary nursery instruments, the present invention is also applicable to a high-low bed or chair or the like, so far as this nursery instrument has a mechanism similar to the above.

Each of the aforementioned embodiments disclosed herein must be considered illustrative in all points and not restrictive. The scope of the present invention is defined not by the above description but by the scope of the patent claims, and it is intended that all modifications within the meaning and range equivalent to the scope of claim for patent are included.

According to the nursery instrument based on the present invention, only the bed face state can be selected until a constant period elapses after birth of a baby, and hence the nursery instrument regularly provides the bed face state to the baby, not to press the abdomen of the baby. Consequently, the nursery instrument will not hinder abdominal respiration of the baby, and the baby can be prevented from an oxygen depletion state, i.e., reduction of percutaneous oxygen saturation ($SpO_2<95\%$). Further, abrupt cardiac standstill resulting from reduction of percutaneous oxygen saturation can be avoided for effectively protecting the baby.

What is claimed is:

1. A nursery instrument capable of selectively functioning as an infant bed and as an infant seat, said nursery instrument comprising a seat portion and a backrest portion capable of assuming an upright seat position and an inclined bed position, said nursery instrument further comprising locating means provided on said backrest portion for selectively positioning said backrest portion relative to said seat portion, a first engaging portion provided on said seat portion for engaging with said locating means to form said infant bed, wherein said seat portion and said backrest portion are substantially flat, a second engaging portion provided on said seat portion for engaging with said locating means to form said infant seat, wherein said backrest portion is in a substantially upright position, an intermediate engaging portion provided on said seat portion for engaging with said locating means to attain an inclination in an intermediate stage between said infant bed and said infant seat, and selection means for enabling only an engagement of said locating means with said first engaging portion to form said infant bed and for disabling an unintended engagement with said second engaging portion and said intermediate engaging portion until a change is positively intended, and wherein said locating means has an engaging member for selectively engaging with said first engaging portion, said second engaging portion and said intermediate engaging portion, said first engaging portion, said second engaging portion and said intermediate engaging portion having a plurality of spaced holes, and wherein said selection means has a plate member sliding along said spaced holes for opening said first engaging portion, said second engaging portion and said intermediate engaging portion in a first position while opening said first engaging portion and closing said second engaging portion and said intermediate engaging portion on a second position.

2. A nursery instrument capable of selectively functioning as an infant bed and as an infant seat, said nursery instrument comprising a seat portion and a backrest portion capable of assuming an upright seat position and an inclined bed position, said nursery instrument further comprising locating means provided on said backrest portion for selectively positioning said backrest portion relative to said seat portion, a first engaging portion provided on said seat portion for engaging with said locating means to form said infant bed, wherein said seat portion and said backrest portion are substantially flat, a second engaging portion provided on said seat portion for engaging with said locating means to form said infant seat, wherein said backrest portion is in a substantially upright position, an intermediate engaging portion provided on said seat portion for engaging with said locating means to attain an inclination in an intermediate stage between said infant bed and said infant seat, and selection means for enabling only an engagement of said locating means with said first and second engaging portions while disabling an engagement with said intermediate engaging portion, and wherein said locating means has an engaging member for selectively engaging with said first engaging portion, said second engaging portion and said intermediate engaging potion, wherein said first engaging portion, said second engaging portion and said intermediate engaging portion having a plurality of spaced holes, and wherein said selection means has a plate member sliding along said spaced holes for opening said first engaging portion, said second engaging portion and said intermediate engaging portion in a first position, while opening said first engaging portion and said second engaging portion and closing said intermediate engaging portion on a second position.

3. The nursery instrument of claim 2, wherein said second engaging portion is located in a position separated from said locating means more than said first engaging portion and said second portion, and wherein said locating means has an engaging member adjustable in its projection length for engaging with said first engaging portion and said second engaging portion while not engaging with said intermediate engaging portion.

* * * * *